United States Patent [19]
Jackson

[11] 3,905,425
[45] Sept. 16, 1975

[54] HYDRAULIC STABILIZER FOR LIMITING MOVEMENT

[76] Inventor: Carl D. Jackson, 712 W. Broadway, Fortville, Ind. 46040

[22] Filed: Dec. 26, 1972

[21] Appl. No.: 318,384

[52] U.S. Cl. ................ 172/321; 172/449; 188/300
[51] Int. Cl.$^2$ ........................................ A01B 63/02
[58] Field of Search ............... 172/321, 446, 449; 280/489; 188/300, 313, 318; 254/24, 93, 105; 52/126

[56] References Cited
UNITED STATES PATENTS

| | | | |
|---|---|---|---|
| 2,704,018 | 3/1955 | Oehler et al. | 172/449 |
| 2,827,186 | 3/1958 | Waite | 188/313 X |
| 2,880,812 | 4/1959 | Morse | 172/446 |
| 3,056,458 | 10/1962 | Gray | 172/501 X |
| 3,193,039 | 7/1965 | Sutton | 188/313 X |
| 3,199,892 | 8/1965 | Boys | 188/300 X |
| 3,311,389 | 3/1967 | Barton et al. | 280/489 |
| 3,614,931 | 10/1971 | Adler | 188/313 X |

*Primary Examiner*—Stephen C. Pellegrino

[57] ABSTRACT

A hydraulic stabilizer mounted to and between a tractor and a lawn finisher for limiting movement therebetween. A piston is slidably mounted within a hydraulic cylinder. A piston rod attached to the piston extends outwardly from the cylinder with the cylinder and piston rod being attached to the tractor and lawn finisher. In one embodiment, a container of liquid is connected by conduits to a liquid outlet positioned at each end of the cylinder with the piston positioned at all times between the liquid outlets. A pair of valves are mounted to the conduits to limit liquid flow within the conduits. To prevent movement between the tractor and lawn finisher, the valves are closed thereby preventing liquid flow through the cylinder and relative movement between the piston and cylinder. To allow relative motion between the tractor and lawn finisher, the valves are opened thereby allowing liquid flow through the cylinder and relative motion between the piston and cylinder. In one variation, liquid pressure is applied to the piston by the force of gravity whereas in an alternate variation, the liquid pressure is applied by a spring biased piston. In another embodiment, the hydraulic cylinder is provided with a pair of outlets positioned at the opposite ends of the cylinder which are connected together by conduits with a valve disposed therebetween. Liquid flow is allowed through the conduits only when the valve is opened thereby allowing relative motion between the piston and cylinder.

2 Claims, 5 Drawing Figures

PATENTED SEP 16 1975  3,905,425

HYDRAULIC STABILIZER FOR LIMITING MOVEMENT

BACKGROUND OF THE INVENTION

Field of the Invention

This invention is in the field of hydraulic devices for limiting movement.

Description of the Prior Art

A number of patents have been granted on various hydraulic devices which are typically utilized for moving various objects. Some of these prior art devices are shown in the following U.S. patents:

U.S. Pat. No. 2,901,215 issued to E. G. Jones;
U.S. Pat. No. 3,065,573 issued to S. Goldberg;
U.S. Pat. No. 3,140,076 issued to W. D. Steadman; and
U.S. Pat. No. 3,659,823 issued to K. H. Griffin.

While hydraulic devices have been devised for moving objects, there is still a need for a hydraulic device which is used to prevent relative movement between two objects. The hydraulic device should allow the operator to lock the two objects together thereby preventing relative movement between the two objects and also allow the operator to unlock the device thereby allowing relative movement between the two objects with the primary moving force being provided by another apparatus.

SUMMARY OF THE INVENTION

One embodiment of the present invention is a hydraulic stabilizer for limiting movement between a first vehicle and a second vehicle attached thereto comprising a cylinder mounted to the first vehicle having an inner surface defining a piston receiving cavity with liquid therein, opposite ends and a first outlet at one of the ends and a second outlet at the other of the ends, a piston slidably mounted in the cavity between the first outlet and the second outlet and in sealing engagement with the inner surface preventing liquid flow past the piston, a piston rod fixedly attached to the piston, the rod extends through the cavity and has a distal end extending outwardly from the cylinder and connected to the second vehicle, a first conduit and a second conduit connected respectively to the first outlet and the second outlet, valve means connected to the first conduit and the second conduit and having an open position allowing liquid flow through the first conduit and into the cylinder via the first outlet and allowing the piston to move toward the second outlet causing the liquid flow from the cylinder via the second outlet through the valve means, and with the piston moving toward the first outlet allowing liquid flow through the second conduit and into the cylinder via the second outlet with liquid flow from the cylinder via the first outlet and through the first conduit, the valve means having a closed position preventing liquid flow through the first conduit and the second conduit and preventing motion between the piston and cylinder.

It is an object of the present invention to provide a device which is operable to prevent relative movement between two objects and which is also operable to allow relative movement between the two objects.

It is a further object of the present invention to provide a hydraulic stabilizer which is mountable to a tractor for limiting relative movement between the tractor and a device towed or pushed by the tractor.

Yet another object of the present invention is to provide a device for maintaining the position of an attachment to a tractor.

Related objects and advantages of the present invention will be apparent from the following description.

DESCRIPTION OF THE PREFERRED EMBODIMENTS

Figure 1:
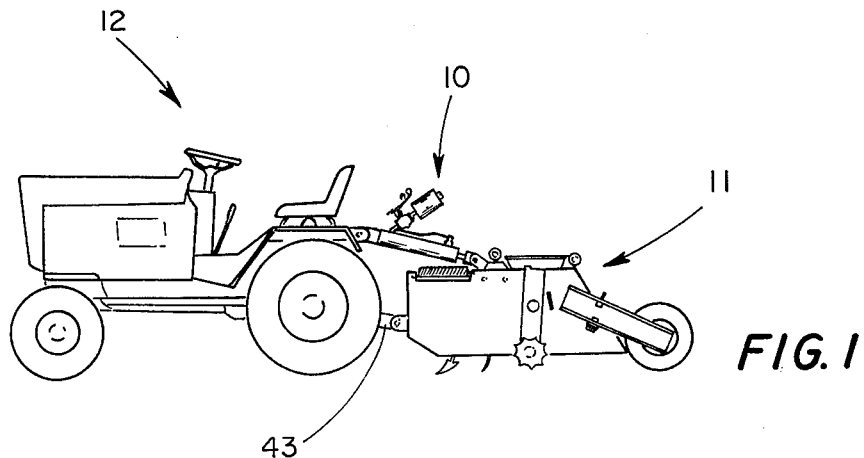
FIG. 1 is a view of a tractor attached to a lawn finisher with a hydraulic stabilizer mounted therebetween which incorporates the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a hydraulic stabilizer 10 for maintaining the position of a lawn finisher 11 with respect to tractor 12. Although the hydraulic stabilizer is shown as attached to the lawn finisher and tractor, it is to be understood that the stabilizer may be mounted to a variety of different types of vehicles.

Figure 2:
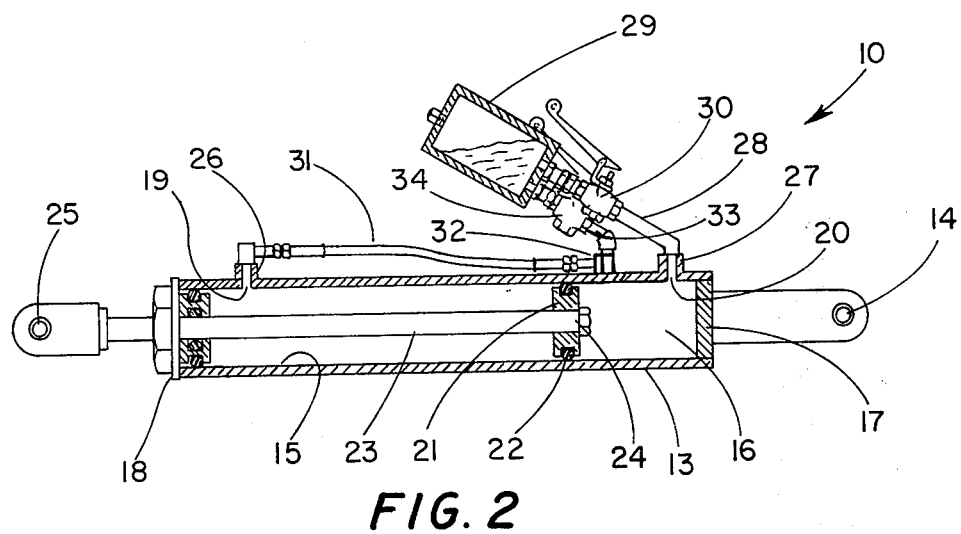
FIG. 2 is an enlarged cross sectional view of the horizontal stabilizer shown in FIG. 1.

Hydraulic stabilizer 10 includes a cylinder 13 (FIG. 2) which is mounted to tractor 12 by ball socket 14. Cylinder 13 has a cylindrical side wall which includes an inner surface 15 defining a cylindrical cavity 16. The opposite ends of cylinder 13 are closed by end cap 17 fixedly secured to the side wall and end cap 18 which is removably secured to the side wall. A pair of liquid outlets 19 and 20 are provided at the opposite ends of the cylinder.

Piston 21 is slidably mounted in the cavity between outlets 19 and 20 and is provided with means such as an O-ring 22 in sealing engagement with surface 15, thereby preventing liquid flow past piston 21. Rod 23 has a proximal end 24 fixedly attached to piston 21. Rod 23 projects sealing through end cap 18 and is attached by ball socket 25 to lawn finisher 11.

A pair of rigid tubes 26 and 27 are respectively mounted to cylinder 13 at outlets 19 and 20. A rigid conduit 28 is coupled to tube 27 with a container 29 mounted atop conduit 28. Conduit 28 is provided with a valve 30 which is operable so as to control the flow of fluid to and from container 29 via conduit 28. A flexible conduit 31 is coupled at one end to tube 26 and at its opposite end to a rigid elbow coupling 32 mounted to cylinder 13. Elbow coupling 32 is also connected to conduit 33 which in turn is connected to container 29 via valve 34.

In order to prevent relative movement between tractor 12 and lawn finisher 11, valves 30 and 34 are closed so as to prevent liquid flow to and from container 29 via conduits 28 and 33. As a result, liquid flow within cylinder 13 is prevented with equal liquid pressure existing on both sides of piston 21 thereby preventing relative movement of the piston with respect to cylinder 13. In order to allow relative movement between the tractor and lawn finisher, valves 30 and 34 are opened thereby allowing liquid flow through conduits 33 and 28. Thus, if the lawn finisher is to move from the tractor, piston 21 will move from outlet 20 towards outlet 19 thereby forcing the fluid between the piston and outlet 19 out through tube 26 and through valve 34 into container 29. Simultaneously, liquid within container 29 will flow through valve 30 towards tube 27 and then into cylinder 13 via outlet 27. In the embodiment shown in FIG. 2, liquid pressure is equalized on both sides of piston 21 by positioning container 29 above cylinder 13 thereby allowing the liquid within container 29 to flow towards cylinder 13 under the force of gravity.

Figure 3:
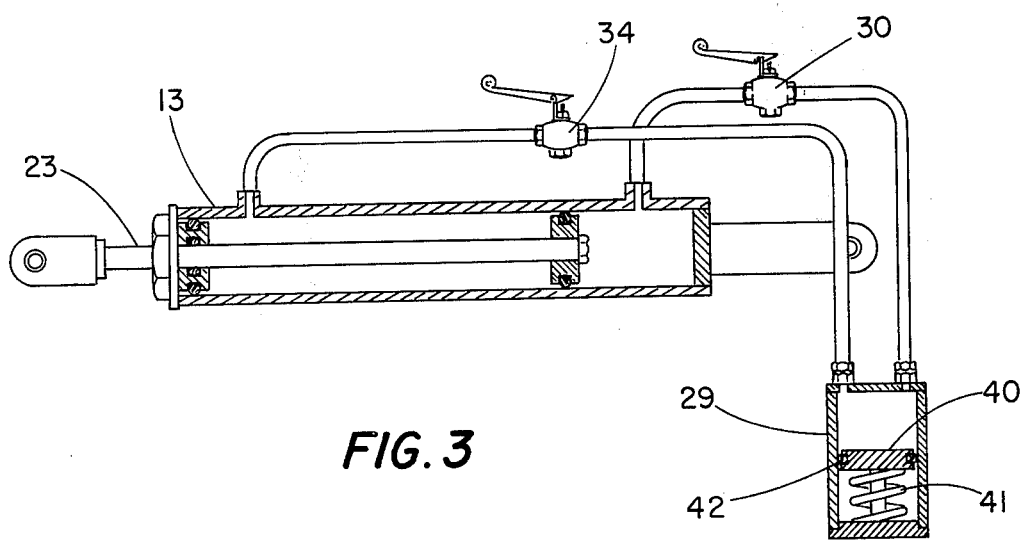
FIG. 3 is the same view as FIG. 2 only showing an alternate variation of the hydraulic stabilizer.

In the variation shown in FIG. 3, container 29 may be positioned either above or below cylinder 13 since piston 40 is biased by spring 41 to force the liquid within the container out through valves 34 and 30 thereby providing equal pressure on both sides of the piston attached to rod 23 positioned within cylinder 13. Piston 40 is provided with sealing means such as an O-ring 42 which is in sealing engagement with the cylindrical inner side wall of container 29.

Vertical movement between tractor 12 and lawn finisher 11 is provided by conventional hydraulic means 43 mounted to the tractor which is operable to raise and lower the lawn finisher. Of course, valves 30 and 34 must be in the open position to allow hydraulic means 43 to vertically move lawn finisher 11. Likewise, when the valves are in the closed position, vertical movement of lawn finisher 11 by the hydraulic means 43 is prevented.

Figure 4:
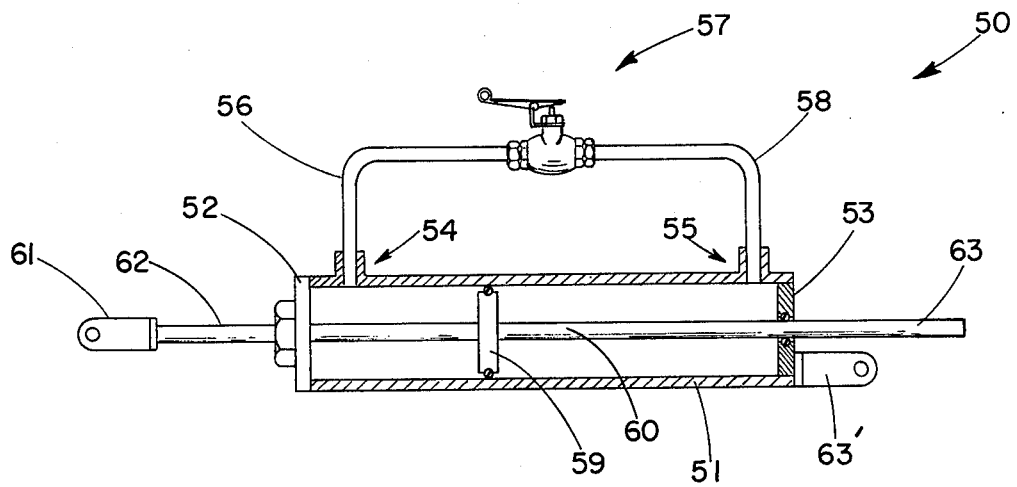
FIG. 4 is a cross sectional view of an alternate embodiment of the horizontal stabilizer.

An alternate embodiment of the horizontal stabilizer is shown in FIG. 4. Stabilizer 50 includes a hollow cylinder 51 closed at its opposite ends by caps 52 and 53. A pair of outlets 54 and 55 are provided respectively adjacent end caps 52 and 53. Conduit 56 has one end attached to outlet 54 and an opposite end connected to valve 57. A second conduit 58 has one end connected to valve 57 and an opposite end connected to outlet 55. Piston 59 is fixedly mounted to piston rod 60 which extends sealingly through end caps 52 and 53. Bracket 61 is fixedly attached to end 62 of rod 60 whereas the opposite end 63 of rod 60 extends externally of the cavity formed by cylinder 51. The conduit and cylinder are filled with liquid. Thus, by opening valve 57, relative motion between piston 59 and cylinder 51 is allowed since the liquid in front of the piston may exit the cylinder through the appropriate conduit with the liquid then passing through valve 57 and the next conduit reentering the cylinder. Piston 59 sealingly engages the inner surface of cylinder 51 to prevent liquid flow past the piston. Likewise, by closing valve 57, fluid flow through conduits 56 and 58 is prevented thereby also preventing movement of liquid within cylinder 51 which prevents movement between piston 59 and cylinder 51. Bracket 63' is fixedly mounted to cylinder 51 to facilitate the mounting of the hydraulic stabilizer.

Figure 5:
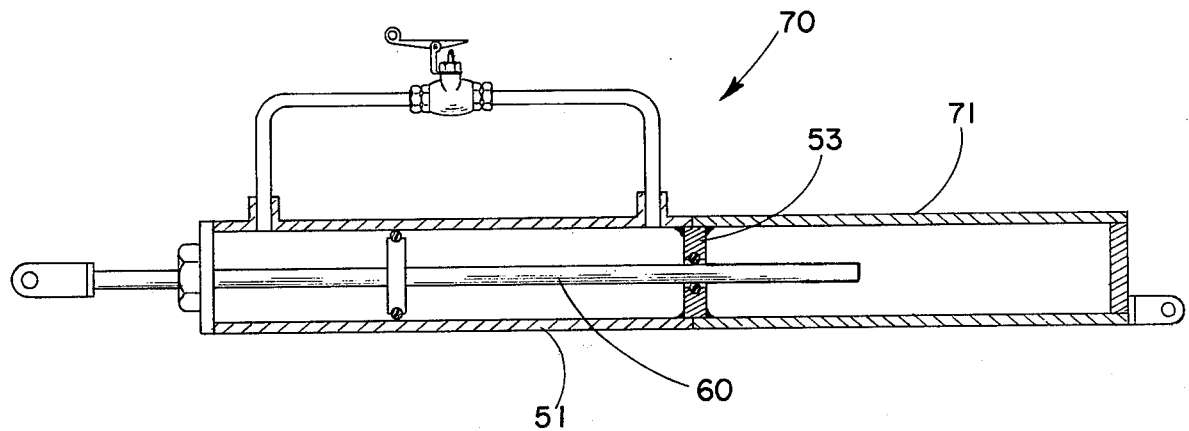
FIG. 5 is a cross sectional view of yet another alternate embodiment of the horizontal stabilizer.

Hydraulic stabilizer 70 shown in FIG. 5 is identical with hydraulic stabilizer 50 with the exception that a cover 71 is mounted to cylinder 51 and end plate 53. The cavity formed by cylinder 51 is filled with liquid whereas the cavity formed by cover 71 is filled with a gas such as air. The distal end of rod 60 projects into the cavity formed by cylinder 71. As shown in FIGS. 4 and 5, rod 60 extends sealingly through end plate 53 which is provided with suitable sealing means such as an O-ring for engaging the rod. Hydraulic stabilizers 50 and 70 have the advantage over the hydraulic stabilizer shown in FIGS. 2 and 3 in that an external container of liquid is not required.

Many variations are contemplated and included in the present invention. For example, in the embodiment shown in the drawing, the liquid utilized within the container and cylinder was oil; however, other types of liquids may be utilized. The stabilizer disclosed herein may also be used with a variety of other vehicles or attachments to tractors such as plows or corn planters. It will be obvious from the above description that the present invention provides an apparatus which will lock and hold a device such as a lawn finisher in position with respect to the tractor after the lawn finisher has been located in the correct position by the standard hydraulic means of the tractor. It will be further obvious from the above description that by closing the valves of the stabilizer, the oil or liquid is trapped within the cylinder thereby preventing movement of the piston within the cylinder. While although a pair of handles are shown in the drawing for operating both valves, it is to be understood that the valves may be coupled so that a single handle may be provided to simultaneously operate both valves.

The lawn finisher shown in the drawing is disclosed and claimed in my U.S. Pat. No. 3,586,111 which is hereby incorporated by reference. The lawn finisher is an earth working device and includes, among other things, a frame with an earth plow and a rake mounted thereon which are engageable with the ground.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

A variety of conventional means 43 may be utilized for raising and lowering the lawn finisher. For example, a category 1, three point hitch such as found on International Harvester Tractor under model number 2400 is satisfactory.

The invention claimed is:

1. A hydraulic stabilizer for limiting movement between a first vehicle and a second vehicle attached thereto comprising:

a cylinder mounted to said first vehicle having an inner surface defining a piston receiving cavity with liquid therein, opposite ends and a first outlet at one of said ends and a second outlet at the other of said ends;

a piston slidably mounted in said cavity between said first outlet and said second outlet and in sealing engagement with said inner surface preventing liquid flow past said piston;

a piston rod fixedly attached to said piston, said rod extends through said cavity and has a distal end extending outwardly from said cylinder and connected to said second vehicle;

a first conduit and a second conduit connected respectively to said first outlet and said second outlet;

valve means connected to said first conduit and said second conduit and having an open position allowing liquid flow through said first conduit and into said cylinder via said first outlet and allowing said piston to move toward said second outlet causing said liquid flow from said cylinder via said second outlet through said valve means, and with said piston moving toward said first outlet allowing liquid flow through said second conduit and into said cylinder via said second outlet with liquid flow from said cylinder via said first outlet and through said first conduit, said valve means having a closed position preventing liquid flow through said first conduit and said second conduit and preventing motion between said piston and cylinder;

a container holding liquid and being connected to said first conduit and said second conduit and wherein:

said valve means includes a first valve and a second valve connected respectively to said first conduit and said second conduit, each having an open position allowing liquid flow from said container through said first conduit and into said cylinder via said first outlet and allowing said piston to move toward said second outlet causing said liquid flow from said cylinder via said second outlet through said second valve to said container, and with said piston moving toward said first outlet allowing liquid flow from said container through said second conduit and into said cylinder via said second outlet with liquid flow from said cylinder via said first outlet and through said first conduit to said container, said first valve and said second valve having a closed position preventing liquid flow through said first conduit and said second conduit and preventing motion between said piston and cylinder;

said container includes an inner cylindrical side wall defining a chamber with liquid therein, said container further includes a movable plate extending across said chamber and in sealing engagement with said cylindrical side wall of said container, said container further includes a spring mounted therein which is in abutting relationship with said movable plate biasing said movable plate to force liquid from said container and through said first conduit and said second conduit;

said first vehicle is a tractor and said second vehicle is an earth working device which includes a frame with a ground engaging tool mounted thereon, said tractor includes hydraulic means mounted thereon operable to raise and lower said earth working device when said first valve and said second valve are in said open position and with said earth working device locked in position with respect to said tractor when said first valve and said second valve are in said closed position.

2. The stabilizer of claim 1 wherein:

said cylinder includes a cylindrical inner wall with a first cap fixedly mounted to said cylindrical inner wall at one of said opposite ends sealing said cavity and a removable cap mounted to said cylindrical inner wall at the other of said opposite ends sealing said cavity;

said rod is slidably and sealingly movable through said removable cap, said first cap has a bracket mounted thereto which has a socket ball pivotally connected to said first vehicle, said distal end of said piston rod has a bracket secured thereto which has another socket ball pivotally connected to a second vehicle allowing relative vertical movement between said first vehicle and said second vehicle when said first valve and said second valve are in said open position.

* * * * *